US011146832B1

(12) United States Patent
Farris et al.

(10) Patent No.: US 11,146,832 B1
(45) Date of Patent: Oct. 12, 2021

(54) DISTRIBUTED STORAGE OF FILES FOR VIDEO CONTENT

(71) Applicant: Amazon Technologies, Inc., Seattle, WA (US)

(72) Inventors: Ryan Farris, Bellevue, WA (US); Jimmy George, Portland, OR (US); Jesse Robert Hepburn, Hillsboro, OR (US); Benjamin Schwartz, Baltimore, MD (US); Mark DeSpain, Hillsboro, OR (US); Mathew P. Jack, Portland, OR (US); Marcin Manek, Portland, OR (US); Prakash Bhasker, Portland, OR (US); Saurav Sengupta, Beaverton, OR (US); Matei Mitaru Berceanu, Portland, OR (US); Akhil Ramachandran, Hillsboro, OR (US); Colleen Marie Toth, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/184,608

(22) Filed: Nov. 8, 2018

(51) Int. Cl.
*H04N 21/218* (2011.01)
*H04L 29/06* (2006.01)
*H04N 21/262* (2011.01)
*H04L 29/08* (2006.01)

(52) U.S. Cl.
CPC ..... *H04N 21/2181* (2013.01); *H04L 65/4084* (2013.01); *H04L 65/80* (2013.01); *H04L 67/1097* (2013.01); *H04N 21/262* (2013.01)

(58) Field of Classification Search
CPC .............. H04N 21/2181; H04N 21/262; H04L 65/4084; H04L 65/80; H04L 67/1097
See application file for complete search history.

(56) References Cited

U.S. PATENT DOCUMENTS

| 6,094,680 | A | * | 7/2000 | Hokanson | ........ | H04N 21/23106 725/1 |
| 10,445,286 | B1 | * | 10/2019 | Nijim | ............... | H04N 21/23106 |
| 2004/0187159 | A1 | * | 9/2004 | Gaydos, Jr. | ........ | H04N 21/2181 725/92 |
| 2011/0191446 | A1 | * | 8/2011 | Dazzi | ..................... | G06F 15/16 709/219 |

(Continued)

*Primary Examiner* — Randy A Flynn
(74) *Attorney, Agent, or Firm* — Lee & Hayes, P.C.

(57) ABSTRACT

This disclosure describes techniques for distributed storage of files that represent video content across different storage tiers to reduce the amount of computing resources used to store the files, while maintaining a low latency when responding to user requests to stream the video content. Video streaming services support the streaming of video content at different resolutions to support various user devices and/or user preferences. To provide streaming of a particular video content item at different resolutions, the video streaming services may store multiple files that represent the video content item for the different resolutions and stream at different bitrates to user devices. The techniques described herein include storing files configured to stream a video content item at different bitrates (and for different display resolutions) in a tiered storage structure to reduce the amount of computing resources taken to store the files.

20 Claims, 10 Drawing Sheets

(56) References Cited

U.S. PATENT DOCUMENTS

| | | | | |
|---|---|---|---|---|
| 2012/0291076 A1* | 11/2012 | Armstrong | ....... | H04N 21/23106 |
| | | | | 725/93 |
| 2013/0297743 A1* | 11/2013 | Eschet | .................... | H04L 65/60 |
| | | | | 709/219 |
| 2014/0297982 A1* | 10/2014 | Duzett | ............. | H04N 21/23106 |
| | | | | 711/165 |
| 2015/0324379 A1* | 11/2015 | Danovitz | ........... | H04N 21/2743 |
| | | | | 707/825 |
| 2017/0359580 A1* | 12/2017 | Su | ........................ | H04N 19/179 |
| 2018/0095696 A1* | 4/2018 | Resch | ..................... | G06F 21/33 |
| 2018/0288451 A1* | 10/2018 | Asif | ................ | H04N 21/23605 |
| 2019/0230385 A1* | 7/2019 | Beck | ................... | H04N 21/658 |
| 2019/0310919 A1* | 10/2019 | Natanzon | ............ | G06F 16/1744 |

* cited by examiner

300

TRANSITION THE SECOND FILE FROM THE SECOND STORAGE TIER TO THE FIRST STORAGE TIER
314

TRANSITION THE STREAM OF THE FIRST DATA AT THE FIRST BITRATE AT A POINT IN TIME IN THE VIDEO CONTENT ITEM
316

STREAM THE SECOND DATA FROM THE POINT IN TIME IN THE VIDEO CONTENT ITEM AT THE SECOND BITRATE TO THE USER DEVICE
318

400

```
OBTAIN A VIDEO CONTENT ITEM OFFERED FOR STREAMING BY A VIDEO STREAMING
SERVICE, THE VIDEO CONTENT ITEM COMPRISING A FIRST FILE COMPRISING FIRST
DATA REPRESENTING THE VIDEO CONTENT ITEM AND A SECOND FILE COMPRISING
SECOND DATA REPRESENTING THE VIDEO CONTENT ITEM
402
```

```
STORE THE FIRST FILE IN A FIRST STORAGE TIER, THE FIRST FILE CONFIGURED TO
BE STREAMED AT A FIRST BITRATE
404
```

```
STORE THE SECOND FILE IN A SECOND STORAGE TIER, THE SECOND FILE
CONFIGURED TO BE STREAMED AT A SECOND BITRATE THAT IS GREATER THAN THE
FIRST BITRATE
406
```

```
RECEIVE A REQUEST TO STREAM THE VIDEO CONTENT ITEM TO A USER DEVICE
408
```

```
MOVE THE SECOND FILE TO THE FIRST STORAGE TIER
410
```

```
MOVE THE SECOND FILE TO THE FIRST STORAGE TIER
412
```

```
STREAM THE SECOND DATA FROM THE FIRST STORAGE TIER TO THE USER DEVICE
AT THE SECOND BITRATE
414
```

FIG. 4

DISTRIBUTED STORAGE OF FILES FOR VIDEO CONTENT

BACKGROUND

Video streaming services provide users with on-demand streaming of video content, such as movies and television shows, and may also provide live streaming of television shows and other streaming media. These video streaming services often store the files for their video content in cloud-based networks across different geographic regions to provide their users with access and availability to stream the video content. To increase user satisfaction, the video streaming services continue to increase the amount of video content available in their video libraries for users to stream. However, the video content files can include relatively large amounts of data, particularly as the display resolution of televisions continues to increase. In light of this, the amount of storage required by the video streaming services to store files for the video content offered for streaming continues to increase. While efficient types of hardware resources and video compression formats exist to reduce the amount of storage resources required for the video content files, these hardware resources and compression formats may result in additional latency when retrieving a video content file from storage to be streamed to a user device. Accordingly, video streaming services continue to look for ways to efficiently store video content files, while reducing latency when providing streaming content to users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example method for storing files representing a video content item in a tiered storage environment, and streaming the video content item to a user device after receiving a request from the user device.

DETAILED DESCRIPTION

Figure 1A:
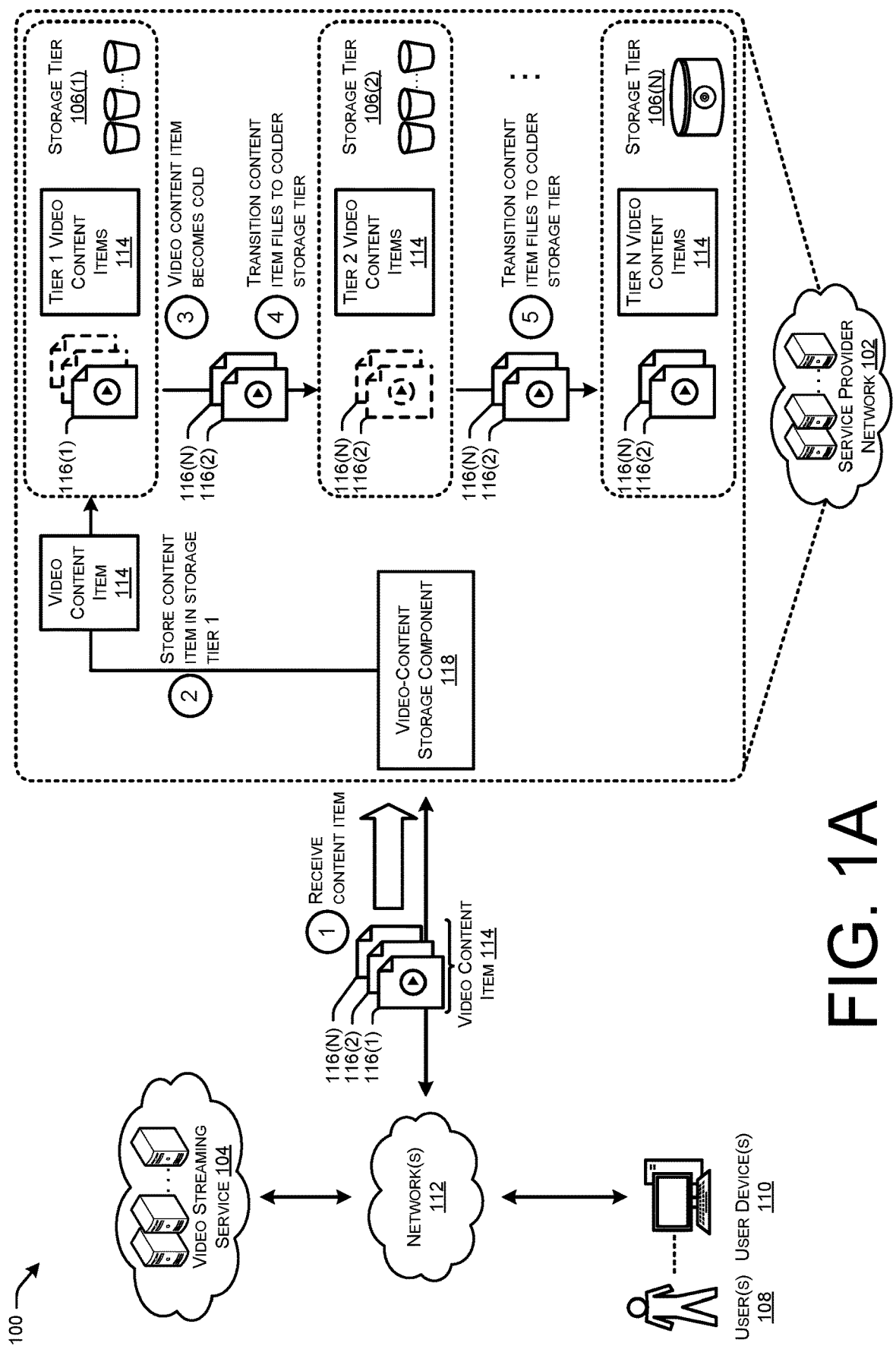
FIG. 1A illustrates a system-architecture diagram of an example environment in which a service provider network stores a video content item for a video streaming service in a tiered storage environment.

This disclosure describes, at least in part, techniques for distributed storage of files that represent video content across different storage tiers to reduce the amount of computing resources used to store the files, while maintaining a low latency when responding to user requests to stream the video content. Video streaming services support the streaming of video content at different resolutions to support various user devices and/or user preferences. To provide streaming of a particular video content item at different resolutions, the video streaming services may store multiple files that represent the video content item for the different resolutions and stream at different bitrates to user devices. The techniques described herein include storing files configured to stream a video content item at different bitrates (and potentially for different display resolutions) in a tiered storage structure to reduce the amount of computing resources taken to store the files, while maintaining low latency when providing on-demand streaming to user devices. Rather than storing all the files configured to stream a video content item according to the different bitrates in a single storage tier for frequently accessed files, the techniques described herein include storing one of the files that is configured for streaming the video content item at a lowest bitrate in the storage tier for more frequently accessed files (referred to herein as a "hot storage tier"), and storing the remaining files configured for streaming the video content item at higher bitrates in one or more storage tiers for less frequently accessed files (referred to herein as "cold storage tiers").

Upon receiving a request from a user device to stream the video content item, the video streaming service may initially begin streaming the file from the hot storage tier to the user device at the lowest bitrate, and begin transitioning or moving the files that are configured to stream the video content item at the higher bitrates from the cold storage tier(s) into the hot storage tier. Once the larger files have been transitioned into the hot storage tier, the video streaming service may begin streaming the larger files at the higher bitrate to the user device to improve the display resolution at the user device. In this way, low latency is achieved by initially streaming a file at a lower bitrate to the user device for a period of time until the larger files are moved into the hot storage tier to be streamed at the higher bitrates, but the resources required to store the larger files representing the video content item is reduced by utilizing the colder storage tiers.

To provide users or subscribers of a video streaming service with video content that is configured to be displayed at resolutions appropriate for their specific user devices and/or user preferences, the video streaming service may maintain or store multiple files for each video content item configured to stream the video content item according to different bitrates, resulting in different display resolutions. For example, a video streaming service may store files for a video content item according to a bitrate ladder, such as a first file that streams at a bitrate of 2,500 Kilobits per second (Kbps) for 720p resolution, a second file that streams at 4,300 Kbps for 1080p resolution, a third file that streams in a bitrate range of 35-45 Mbps for 4K resolution, 8K resolution, and so forth. In this way, the video streaming service may be able to select an appropriate file representing the video content item to stream to a user device at the appropriate bitrate for their device and/or preferences. To reduce latency between a request from a user device for a particular video content item and returning the stream of data for the particular video content item, the techniques described herein may maintain all of the files representing the video content item in the bitrate ladder (or bitrate bouquet) in a storage tier for more frequently accessed data, or a hot storage tier. For instance, the hot storage tier may be configured to provide high throughput of data with low latency, resulting in high performance when streaming video data from storage to a user device. In this way, user devices may be provided with a stream of video data at a desirable bitrate (often the higher bitrates for higher definition video presentation) with low latency. However, hot storage tiers may have a higher associated computing costs or other costs due to, for example, the use of expensive hardware, the amount of energy and/or processing required to keep files stored in a "spun up" or accessible state, and so forth.

In some examples, rather than maintaining multiple files representing a particular video content item that are configured for streaming at different bitrates in a hot storage tier, the techniques described herein include storing or "pinning" one of the files in the hot storage tier, but moving or transitioning one or more of the files, such as the higher bitrate files, into colder storage tiers. A video streaming service may store multiple files for each video content item in a hot storage tier such that each file is readily available for streaming with low latency at varying bitrates to different user devices. While it may be advantageous to maintain all the different files in a hot storage tier for video content items that are frequently accessed or streamed by user devices (popular video content), video content items that are less popular or stream less often may be wasting computing resources, such processing power, energy, and/or specialized storage hardware. Accordingly, if the video streaming service determines that a video content item has not been accessed or streamed by a user device for more than a threshold period of time (e.g., a day, a week, a month, etc.), or has "gone cold," the video streaming service may determine to store or "pin" one of the files to the hot storage tier, such as the smallest file corresponding to the lowest bitrate, and move or transition the remaining files for that content item to one or more colder storage tiers for more permanent storage. In this way, the video streaming service may store the generally larger files to stream a video content item at higher bitrates in colder storage tiers that utilize less computing resources, but the video streaming service may still provide streaming for the video content item with low latency using the file pinned to the hot storage tier.

For example, the video streaming service may have determined that a particular video content item has gone cold, or has not been streamed by a user device for more than a period of time, and have transitioned the larger files representing the video content item for higher bitrate streaming to colder storage tiers. However, video streaming service may have pinned, or maintained in storage, the smallest file representing the video content item in the hot storage tier. The video streaming service may receive a request from a user device to stream the video content item. In such examples, the video streaming service may begin streaming the smaller file from the hot storage tier to provide a low latency, on-demand streaming experience for the user device. Additionally, the video streaming service may begin transitioning or moving the other files representing the video content item from cold storage tiers into the hot storage tier. As the larger files configured to stream the video content item at higher bitrates finish moving into the hot storage tier, the video streaming service may iteratively begin streaming the larger files at the higher bitrate to the user device. For instance, the file configured to stream the video content item at a bitrate for a 720p display resolution may finish transitioning into the hot storage tier before the file for 1080p. The video streaming service may continue to stream from the larger files for the higher bitrates as the files are transitioned, or "rehydrated," into the hot storage tier. In this way, as the user device is consuming the video content item, the bitrate, and resulting display resolution, may continue to increase as the larger files configured for higher bitrate streaming continue to finish transitioning, at least partly, into the hot storage tier.

In some examples, after the larger files representing the video content item have been moved into the hot storage tier, the video streaming service may determine to maintain, or keep, the larger files in the hot storage tier for a period of time. For instance, a user device requesting to stream a video content item for the first time after a longer period of time from the last stream may indicate that additional user devices will request to stream the video content item soon as well, or indicate that the video content item will become popular. For instance, a particular video content item may be approaching, or have hit, its 50th anniversary from when it was first released. In such an example, the video streaming service may keep the larger files for the video content item stored in the hot storage tier to stream the video content item at the higher bit rates to subsequently requesting user devices. However, if the video content item does not receive subsequent requests for a period of time after the initial requests, or receives a smaller number of requests during a period of time, the video streaming service may determine to transition or move the larger files representing the video content item back to colder storage tiers.

In some examples, various predictive techniques (or events) may be utilized to determine to move the larger files representing the video content item from a colder storage tier to the hot storage tier. For instance, if one or more users have begun streaming old episodes of a particular show, the video streaming service may determine that the user will continue to request to view additional episodes from the show. Thus, the video streaming service may begin transitioning larger files for the show from a cold storage tier to the hot storage tier in anticipation of the user(s) requesting to view additional episodes. As another example, the video streaming service may determine that a video content item is likely to become popular soon due an anniversary of the video content item, a particular holiday season for the video content item, social media indicating that the video content item is popular, and/or using other predictive attributers. For instance, the video streaming service may begin moving larger files for video content items that are related to the winter holidays as the holidays begin to approach in anticipation that users will want to stream holiday movies.

Although the techniques are described with reference to various video content items (e.g., movies, TV shows, live TV streaming, online videos, etc.), the techniques are generally applicable to any type of content that may stream according to different bitrates. For instance, music content that may stream at different bitrates using different files may similarly utilize the techniques described herein for tiered storage.

The techniques described herein provide various improvements and efficiencies with respect to utilizing computing resources while maintaining various advantages of existing techniques. For instance, by moving "cold" or uncommonly accessed video content items from hot storage tiers to cold storage tiers, the amount of energy and/or processing required to store video content items may be reduced. Additionally, the high responsiveness and low latency provided by hot storage tiers is maintained for cold items by pinning, or maintaining, at least one file in the hot storage tier to be streamed upon a user request.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a system-architecture diagram of an example environment 100 in which a service provider network 102 stores a video content item for a video streaming service 104 in a tiered storage environment that includes multiple storage tiers 106 (e.g., storage tier 106(1), storage tier 106(2), up to storage tier (N) where "N" is any number greater than 1).

In some examples, the service provider network 102 may comprise clusters of managed servers stored in data centers located across geographic areas. The service provider network 102 may be a distributed network through which users 108 (often customers) may interact via user devices 110 to manage or otherwise interact with service provided by the service provider network 102. The users 108 may comprise one or more of individual users, groups of users, organizations, businesses, or other entities that interact with the service provider network 102 via respective user devices 110(1), 110(2), through 110(N) (collectively referred to as "user devices 110"). The user devices 110 may be any type of computing device capable of connecting to the service provider network 102 via a suitable data communications network 112 such as, but not limited to, a laptop or desktop computer, a tablet computing device, a server computer, a television, or a mobile telephone. Administrative users employed by the operator of the service provider network 102, such as administrators managing the operation of the service provider network 102, might also connect with, manage, and utilize resources provided by the service provider network 102 in a similar fashion.

The service provider network 102 may be managed by a service provider, and may provide, or be associated, with various types of services, such as the video streaming service 104. In some examples, the video streaming service 104 may be managed, or operated, by the service provider network 102. However, other examples the video streaming service 104 may be a customer or otherwise associated with the service provider network 102. For instance, the video streaming service 104 may be a third-party service that utilizes a cloud-based storage and delivery network provided by the service provider network 102 to store and manage their video content items 114. In either example, the video streaming service 104 may interact with the users 108, which may be customers, to provide live and/or on-demand streaming of video content to the user devices 110. For instance, the video streaming service 104 may offer live streaming of video content items 114 to the use devices 110, and/or may provide a catalogue or library of on-demand video content items 114 from which users 108 may select for streaming to their user devices 110. The video streaming service 104 may utilize the service provider network 102 to provide the static and/or dynamic web-based video content to the users 108. In some examples, the service provider network 102 may provide the video content items 114 for streaming using a network of data centers (or "edge locations"). In such examples, when a user 108 requests a video content item 114, the user device 110 is routed to the data center that provides the lowest latency to help the video content item 114 be delivered with higher performance. In this way, the video streaming service 104 need not invest in the geographically disparate data centers to provide storage and access to video content items 114.

The service provider network 102 may, at "1," receive a video content item 114 from the video streaming service 104 that the service 104 would like to provide their users 108 with access to for streaming. The video content item 114 may be represented by, include, or otherwise be associated, with one or more video content files 116 (also referred to herein as "files 116"). Each of the files 116 may include respective data that individually represents the video content item 114 when rendered on a display. However, the individual files 116 may stream the video content item 114 at different bitrates, resulting in different display resolutions when displayed on a display of the user devices 110. For example, the file 116(1) may stream at a bitrate of 2,500 Kilobits per second (Kbps) for 720p resolution, the file 116(2) may stream at 4,300 Kbps for 1080p resolution, a third file 116(N) may stream in a bitrate range of 35-45 Mbps for 4K resolution, and so forth. In this way, the user devices 110 may stream the video content item 114 at different bitrates for different display resolutions based on device type (e.g., phone versus television), and/or user preferences (e.g., a user 108 may pay for high definition, a different user 108 may pay for standard definition, etc.).

The service provider network 102 may include a video-content storage component 118 configured to store video content items 114 in the distributed storage tiers 106 as described herein. At "2", the video-content storage component 118 may store the video content item 114 in storage tier 106(1), which may be a hot storage tier in that the storage tier 106(1) is configured to store files 116 that are more frequently accessed or streamed compared to the other storage tiers 116. The storage tier 106(1) may comprise cloud-based object storage. The cloud-based object storage may include various file folders that store objects, which may comprise data and descriptive metadata. The storage tier 106(1) may provide low latency and high throughput of video data included in the video content files 116. The storage tier 106(1) may be configured for storing and retrieving files 116 that are accessed more frequently than files 116 store in the colder storage tiers 116.

After the video-content storage component 118 has stored the video content item 114 in the hot storage tier 106(1) along with the tier 1 video content items 114, the video-content storage component 118 may begin monitoring the usage or access/stream events for the video content item 114 that was recently stored. If the video content item 114 is accessed or streamed by users 108 at higher than a threshold rate, the video-content storage component 118 may store all of the files 116 for the video content item 114 in the hot storage tier 106(1) to provide low latency of the video content file 114 at a high bitrate. However, the video-content storage component 118 may determine that the video content item 114 has not been accessed by a user 108 for a period of time (e.g., a day, a week, a month, etc.), or has been accessed less than a threshold number of times (e.g., 3, 5, 10, etc.) over a predefined period of time.

Figure 1B:
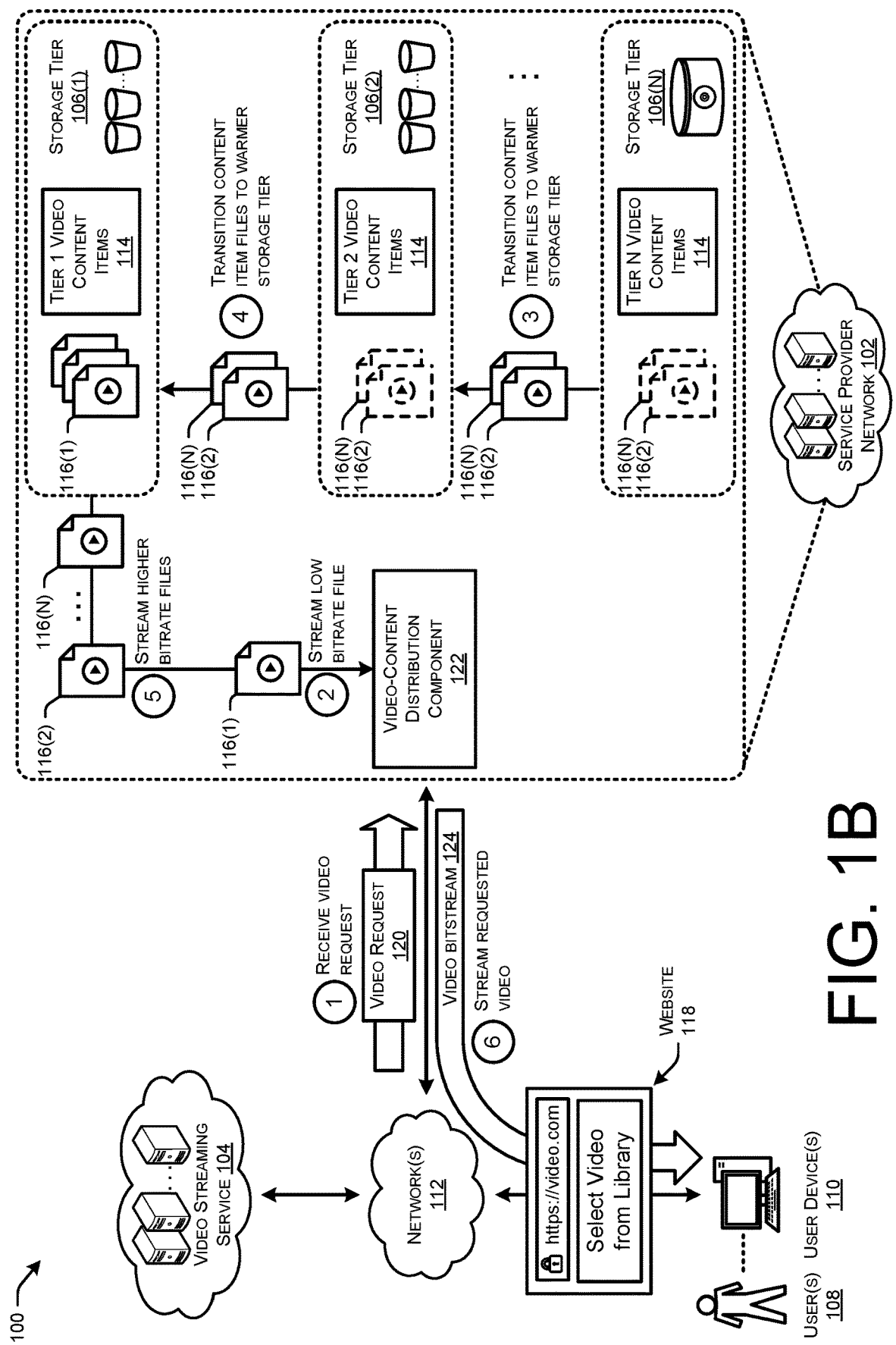
FIG. 1B illustrates a system-architecture of an example environment in which a service provider network retrieves a video content item from a tiered storage environment and streams the video content item to a user device.

In such examples, the video-content storage component 118 may determine, at "3", that the video content item 114 has become "cold," or has been infrequently accessed during the period of time, or not accessed at all. In such examples, the video-content storage component 118 may, at "4", move or transition one or more of the files 116 to a colder storage tier 116. Generally, moving and/or transitioning the files 116 between storage tiers 106 may comprise copying the files from one storage tier 106, and placing them into a new storage tier 106, transferring the data in the files 116 over a communication interface from one storage tier 106 to another storage tier 106, and so forth. Once a file 116 has been moved or transferred from one storage tier 106 into another storage tier 106, the file 116 is removed (or deleted) from the old storage tier 116 to make room for new files. In some examples, moving and/or transitioning the files between storage tiers 106 may include or be a copy and purge operation where the file(s) 116 are copied to a destination tier 106 and purged from the origination tier 106. As shown in FIGS. 1A and 1B, the dashed lines for the files 116 may indicate that the files 116 have been transitioned, or purged, from a storage tier 106 in which they were previously stored. The files 116 with solid lines may indicate that the files 116 are currently stored in the storage tier 106.

As illustrated in FIG. 1A, the video-content storage component 118 may transition all of the files 116 besides one of the files 116(1) for the video content item 114 into a colder storage tier 106. The file 116(1) that is maintained in the hot storage tier 106(1) may be any of the files 116, such as the smallest file 116(1) that streams the video content item 114 at the lowest bitrate to a user device 110. The other files 116(2)-116(N) may be transitioned into a colder storage tier 106. Depending on the preferences of the video streaming service 104, or the users 108, the files 116(2)-116(N) may be transitioned into the next lowest storage tier 106(2), or alternatively, the files 116(2)-116(N) may be moved directly into the coldest storage tier 116(N).

In the example where the video-content storage component 118 moves the files 116(2)-116(N) into the next coldest storage tier 106(2), the video-content storage component 118 may again monitor the video content item 114 and determine whether a user 108 accessed or streamed the video content item 114 to their user device 110 for a period of time. The period of time may be the same as, or different than, the period of time taken before moving the files 116(2)-116(N) to the storage tier 116(2). The video-content storage component 118 may determine that the video content item 114 has not been accessed for the period of time, and determine, at "5", to transition the video content item files 116(2)-116(N) to a colder storage tier 106, which may be the coldest storage tier 106(N). Generally, the coldest storage tier 106(N) may have the highest latency, and the highest retrieval time, out of the storage tiers 106. However, the storage tier 106(N) may require the least amount of energy and/or processing to store the files 116(2)-116(N). Additionally, the storage tier 106(N) may utilize less expensive or complicated storage hardware that consumes the lesser amounts of energy or processing, such as hard disk drives, solid state drives, floppy disks, magnetic tape, optical disks, various forms of Random Operating Memory (ROM) that can be powered down, storage instances that can be powered down, and/or any other type of memory usable for storing/archiving files 116 that are very infrequently accessed. In some examples, the coldest storage tier 106(N) may comprise nearline storage that is used for offline storage or archiving. However, the storage tier 106(N) may have relatively slow retrieval options, such as faster revival (e.g., 1 minute, 5 minutes, etc.), standard retrieval (e.g., 3 hours, 5 hours, etc.), and/or bulk retrievals for large amounts of data (e.g., 5 hours, 10 hours, etc.). In this way, the files 116(2)-116(N) that contain larger amounts of data to stream the video content item 114 at higher bit rates may be stored in the more long-term, archive storage in the storage tier 106(N) to conserve energy, processing power, and/or other resources.

In some examples, the service provider network 102 and/or the video streaming service 104 may provide streaming of video content items 104 to user devices 110 at higher bitrates, rather than the lower bitrates. For instance, a user 108 may register to only receive video content items 114 for display at a high display resolution (e.g., 4K, 8K, etc.). In such examples, the video-content storage component 118 may store a portion of the higher bitrate file 116 to stream at the higher display resolution to the hot storage tier 106(1). For instance, the video-content storage component 118 may store enough data from the higher bitrate file 116 such that the user device 110 may stream 5-10 minutes of the video content item 114 from the storage tier 106(1) while the remaining data of the higher bitrate file 116 is moved from colder storage tiers 106 to the hot storage tier 106. The amount of data from the higher bitrate file 106 that is stored in the storage tier 106(1) may be based on a retrieval time to obtain the rest of the file 106 from colder storage 106. In this way, only a portion of a higher bitrate file 116 may be stored in the hot storage tier 106(1) to provide the user 108 with a higher display resolution for the video content item 114, but at least a portion of the higher bitrate file 116 may be stored in a colder storage tier 106 to conserve computing resources.

The storage tiers 106 described above may be provided in one particular implementation by one or more data centers operated by the service provider network 102. As known to those skilled in the art, data centers are facilities utilized to house and operate computer systems and associated components. Data centers also typically include redundant and backup power, communications, cooling, and security systems. The data centers might be located in geographically disparate regions, and might also be connected to various other facilities, such as co-location facilities, and various wide area networks ("WANs"), such as the Internet. Although described as having particular memory types, the storage tiers 106 may comprise any type of memory, and have different latencies for retrieving data therefrom based on the type of memory/storage and/or for other configuration reasons. Additionally, there may only be storage tiers 106 in some examples, or any number of storage tiers 106, depending on the service provider network 102.

In some examples, rather than storing all of the files 116 in the hot storage tier 106(1) initially, and transitioning the higher bit rate files 116(2)-116(N) to the colder storage tiers 106(2)-106(N) after a period of time, the higher bit rate files 116(2)-116(N) may be initially stored in the colder storage tiers 106(2)-106(N) at "2" after being received or obtained. For instance, the video streaming service 104, user 108, service provider network 102, and/or other entity may define preferences indicating that all video content items 114, or particular video content items 114, have the higher bit rate files 116(2)-116(N) immediately stored in the colder storage tiers 106(2)-106(N) after being obtained. In this way, the higher bit rate files 116(2)-116(N) may need not be stored in the hot storage tier 106(1), and transitioned to colder storage tiers 106 after becoming cold or for another reason. In further examples, the video streaming service 104 and/or service provider network 102 may cause the higher bit rate files 116(2)-116(N) to be transitioned to the colder storage tiers 106, such as providing input, rather than waiting for a threshold period of time to pass.

In some examples, the service provider network 102 may pin or store another file 116 in the hot storage tier 106(1) other than the file 116 configured to be streamed at the lowest bitrate. For instance, the service provider network 102 may cause a particular file 106 for a particular type of device (e.g., mobile phone) to be stored in the storage tier 106(1). For instance, the video streaming service 104 and/or service provider network 102 may determine that a particular area has a large number of users 108 that stream the video content items 114 using mobile phones, and that a file 116 configured to stream to mobile devices is to be stored in the hot storage tier 106(1).

In various examples, the higher bitrate files 116 may be moved directly into colder storage tiers 106 after a short period of time in the hot storage tier 106(1), or without being in the hot storage tier 106(1) at all, due to popularity of the video content items 114. For instance, the video content items 114 may be offered in a video library or catalogue of the video streaming service 104 currently, and the video streaming service 104 may request that the service provider network 102 start performing the storage techniques using tiered storage as described herein. In such examples, the service provider network 102 may determine which video content items 114 are less popular (e.g., less than a threshold number of streaming events, have not been streamed for more than a threshold period of time, etc.) and move the higher bitrate files 116 for those video content items 114 into colder storage tiers 106.

FIG. 1B illustrates a system-architecture of the example environment 100 in which the service provider network 102 retrieves a video content item 114 from a tiered storage environment and streams the video content item 114 to a user device 110 using different bit rates.

In some examples, the user 108 may use their user device 110 to navigate to a website 118 associated with the video streaming service 104. The website 118 (or other online location) may allow the user 108 to select a video to stream that is provided as part of a video library or catalogue of the video streaming service 104. Upon selecting a video content item 114 to stream, the service provider network 102 may, at "1", receive a video request 120 to stream the selected video content item 114 to the user device 110. The video request 120 may indicate the requested video content item 114 and the user device 110 to which the video content item 114 is to be streamed.

After receiving the video request 120, a video-content distribution component 122 may, at "2", begin streaming the low bitrate file 116(1) for the video content item 114. For instance, the video-content distribution component 122 may determine that, for the particular video content item 114, the low bitrate file 116(1) is stored in the hot storage tier 106(1), but that the larger, higher bitrate files 116(2)-116(N) are stored in a colder storage tier 106. In such examples, the video-content distribution component 122 may cause the lower bitrate file 116(1) to begin streaming as part of a video bitstream 124 to the user device 110 to be consumed by a media player. In such examples, the video-content distribution component 122 may, at "3" and "4", begin transitioning the video content item files 116(2)-116(N) from the colder storage tiers 106 to the hot storage tier 106(1). The files 116(2)-116(N) may be moved directly from the colder storage tiers 106(2)-106(N) into the hot storage tier 106(1), or be moved or transitioned up through each of the storage tiers 106 and back into the storage tier 106(1). Generally, a file 116 may be available for streaming once at least a segment of the data in the file 116 is transitioned into the hotter storage tier 106 and available for streaming.

As the files 116(2)-116(N) are moved into the hot storage tier 106(1), the video-content distribution component 122 may make the larger files 116 available for streaming by the user devices 110 and consumed by the media players. In some instances, the files 116 may be transitioned up in segments or chunks such that, once enough of the files 116 have been moved into the storage tier 106(1), the larger files 116 may be made available for streaming by the user devices 110 while the remainder of the larger files 116 continue to be transitioned in chunks or segments into the storage tier 106(1). However, in some examples, the larger files 116(2)-116(N) may not be made available for streamlining until the entire file 116 is moved into the hot storage tier 106(1). The manifest may be updated as segments arrive in the hot storage tier 106(1) such that the segments (e.g., 6 second segments) may be served or available for service to the user devices 110.

At "5" the video-content distribution component 122 may begin streaming the higher bitrate files 116 in the video bitstream 124 to the user device(s) 110 such that the requested video content item 114 is streamed at "6" to the user devices 110 at the appropriate, or highest, bitrate. In this way, the video bitstream 124 may perform a handoff between streaming of the different files 116 as segments of the larger files 116 are transitioned up into the hot storage tier 106(1). Once moved into the hot storage tier 106(1), the larger files 116 may be maintained for a threshold period of time if no further streams are requested from users 108.

Figure 2:
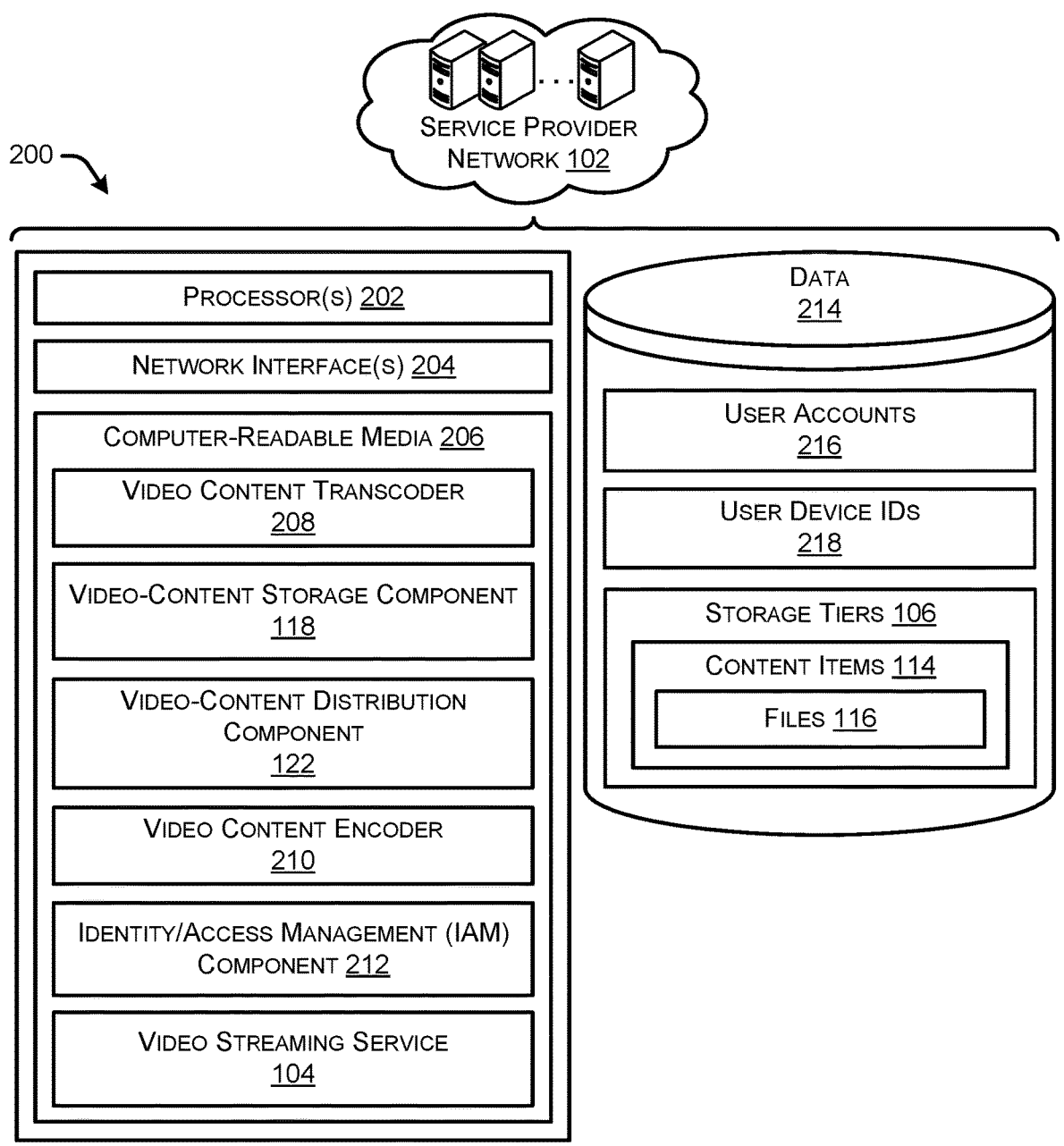
FIG. 2 illustrates a component diagram illustrating example components of a service provider network.

FIG. 2 illustrates a component diagram illustrating example components of a service provider network 102. As shown in FIG. 2, the service provider network 102 may include the video streaming service 104 in some examples. However, in other examples the video streaming service 104 may be a third party service that utilizes the service provider network 102 to perform storage, retrieval, streaming, and other operations on behalf of the video streaming service 104.

As illustrated, the service provider network 102 may include one or more hardware processors 202 (processors) configured to execute one or more stored instructions. The processor(s) 202 may comprise one or more cores. Further, the service provider network 102 may include one or more network interfaces 204 configured to provide communications between the service provider network 102 and other devices, such as the user device(s) 110. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The service provider network 102 may include computer-readable media 206 that stores the video-content storage component 118 configured to, when executed by the processor(s) 202, perform the storage, pinning, and/or transitioning operations described herein for managing the storage of the video content items 114 and files 116. Further, the service provider network 102 may include the video-content distribution component 122 configured to, when executed by the processor(s) 202, perform the retrieving, transitioning, and/or streaming operations described herein for providing the video content items 114 and files 116 to user devices 110.

The computer-readable media 206 may include additional components for managing video content items 114 and files 116, such as a video content transcoder 208, and a video content encoder 210. The video content transcoder 208 may, when executed by the processor(s) 202, transcode media files into a streaming package, or into appropriate formats for streaming. The transcoder 208 may be a callable API or any other type of component that takes an input file, such as a media file, and turns it into one or more output files based on instructions and transcoding settings provided for the media file. The video content encoder 210 may, when executed by the processor(s) 202, encode a video content item 114, and/or a particular file 116, for streaming, such as live and/or on-demand broadcast and streaming delivery.

Further, the computer-readable media 206 may store an identity/access management (IAM) component 212, which is executable by the processor(s) 202 to perform various operations. For example, to utilize the services provided by the service provider network 102, a user 108 may register for an account 216 with the service provider network 102. For instance, users 108 may utilize their devices 110 to interact with the IAM component 212 that allows the users 108 to create user accounts 216 with the service provider network 102. Generally, the IAM component 212 may enable users 108 to utilize the video streaming service 104 and stream video content items 114. Using the IAM component 212, users can provide input, such as requests 120, for streaming of video content items 114 from the service provider network 102. Each user 108 that is permitted to stream video content items 114 using a particular account 216 may have a user identity/profile assigned to them. In this way, users may log in with sign-in credentials to their account(s) 216, perform operations, such as submitting a request 120 to stream a video content item 114.

Further, the user accounts 216 may be associated with, or indicate, one or more user device IDs 218 for devices 110 utilized by the users 108 to stream content items 114. The user device IDs 218 may indicate the device types (e.g., mobile phone type, table type, laptop computer type, etc.), display screen sizes for the devices 110, display resolution capabilities and/or preferences, and so forth. In this way, the service provider network 102 and/or video streaming service 104 may determine which file 116 representing a video content item 114 to stream to a particular user device 110 based on the user device IDs 218.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein.

FIGS. 3A, 3B, 4, and 5 illustrate flow diagrams of example methods 300, 400, and 500 that illustrate aspects of the functions performed at least partly by the service provider network 102 as described in FIGS. 1A, 1B, and 2. The logical operations described herein with respect to FIGS. 3A, 3B, 4, and 5 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3A, 3B, 4, and 5 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 3A:
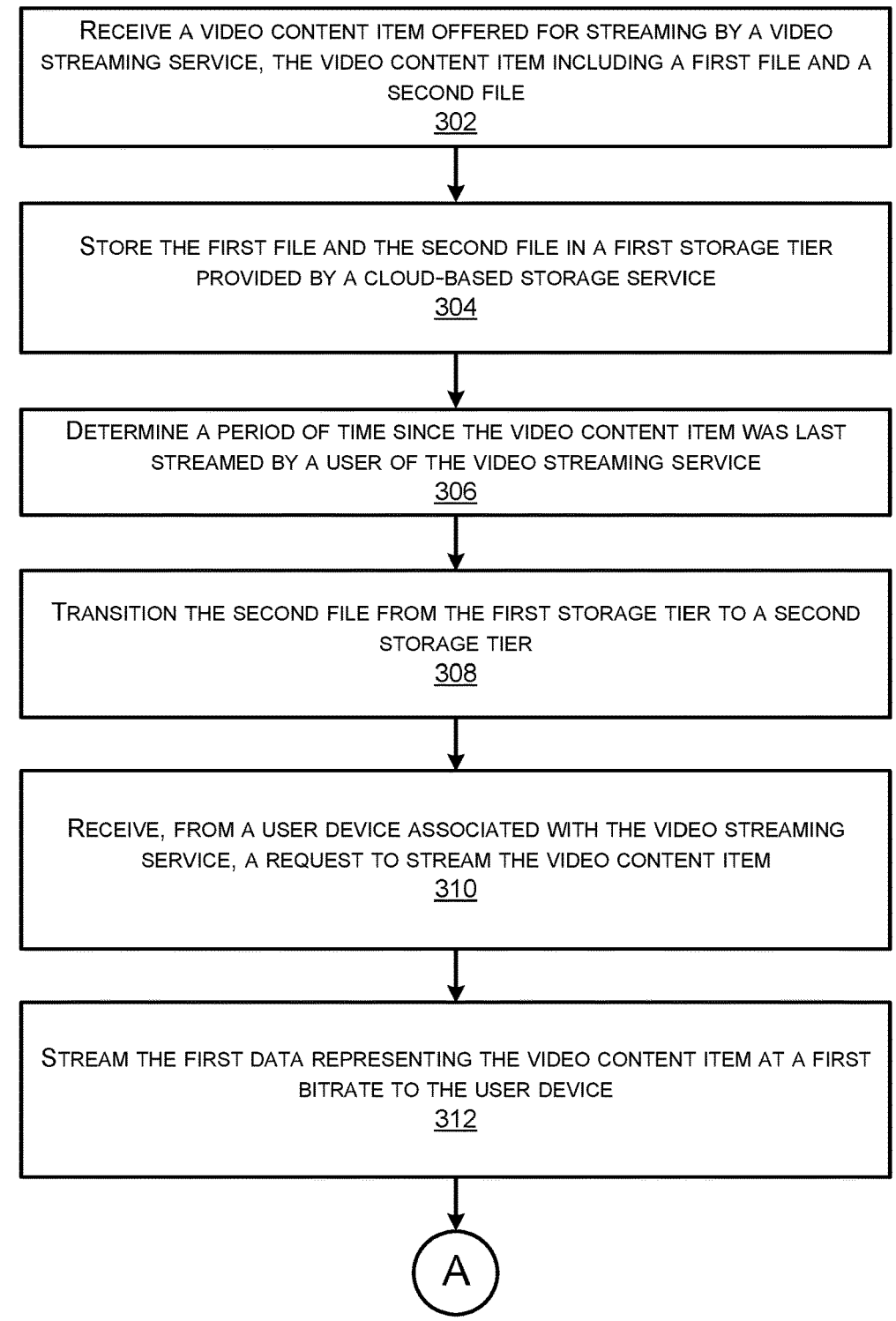
FIGS. 3A and 3B illustrate a flow diagram of an example method for storing files representing a video content item in a tiered storage environment for a period of time, and streaming the video content item to a user device after receiving a request from the user device.
Figure 3B:
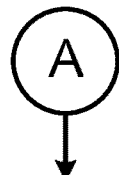

FIGS. 3A and 3B illustrate a flow diagram of an example method 300 for storing files 116 representing a video content item 114 in a tiered storage environment for a period of time, and streaming the video content item 114 to a user device 110 after receiving a request from the user device 110.

At 302, the service provider network 102 may receive a video content item offered for streaming by a video streaming service. In some examples, the video content item includes a first file comprising first data representing the video content item and configured to be streamed at a first bitrate, and a second file comprising second data representing the video content item and configured to be streamed at a second bitrate that is greater than the first bitrate, wherein the second data is greater than the first data.

At 304, the service provider network 102 may store the first file and the second file in a first storage tier provided by a cloud-based storage service. At 306, the service provider network 102 may determine a period of time since the video content item was last streamed by a user of the video streaming service.

At 308, the service provider network 102 may, based on the period of time, transition the second file from the first storage tier to a second storage tier. In such examples, the second storage tier stores files that are accessed less frequently than files in the first storage tier. At 310, the service provider network 102 may receive, from a user device associated with the video streaming service, a request to stream the video content item.

At 312, the service provider network 102 may, responsive to receiving the request to stream the video content item, stream the first data representing the video content item at the first bitrate to the user device. Further, at 314, the service provider network 102 may transition the second file from the second storage tier to the first storage tier.

At 316, the service provider network 102 may, subsequent to transitioning the second file to the first storage tier, terminate the stream of the first data at the first bitrate at a point in time in the video content item. Further, at 318, the service provider network 102 may stream the second data from the point in time in the video content item at the second bitrate to the user device.

In some examples, the first storage tier may be associated with a first latency between receiving requests for video content items stored in the first storage tier and streaming the video content items, and second storage tier is associated with a second latency between receiving requests for video content items stored in the second storage tier and streaming the video content items. The second latency may be greater than the first latency such that video content items 114 stored in the first storage tier are retrieved and accessible for streaming in a shorter period of time than video content items 114 stored in the second storage tier.

In some instances, the method 300 may further comprise subsequent to streaming the second data to the user device, determining that the video content item was streamed by additional user devices more than a threshold number of times. For instance, other users 108 may have streamed the video content item 114 after the second data was moved into the first storage tier. Based at least in part on the video content item 114 being streamed more than the threshold number of times, the service provider network 102 may refrain from moving the second file from the first storage tier for a second period of time. In this way, the second file 116 may be maintained in the first storage tier 116 to be accessible, with lower latency, for streaming by other user devices 110.

In some examples, the method 300 may further include determining a first portion of the first data based at least in part on a retrieval time associated with retrieving files from the second storage tier. For example, depending on how long it takes to retrieve files 116, or segments (e.g., data, objects, etc.) of files 1116 from the second storage tier, the service provider network 102 may determine the first portion of the first data that can be streamed to a user device 110 for long enough to ensure that the rest of the first data can be transitioned into the first storage tier 116(1). In such examples, the service provider network 102 may transition a second portion of the first data (e.g., the remainder of the first data) from the first storage tier to the second storage tier, and responsive to receiving the request to stream the video content item, transition the second portion of the first data back to the first storage tier at least partly while the first portion is being streamed.

FIG. 4 illustrates a flow diagram of an example method 400 for storing files representing a video content item in a tiered storage environment, and streaming the video content item to a user device after receiving a request from the user device.

At 402, the service provider network 102 may obtain a video content item offered for streaming by a video streaming service. In some examples, the video content item may comprise a first file comprising first data representing the video content item and a second file comprising second data representing the video content item.

At 404, the service provider network 102 may store the first file in a first storage tier, the first file configured to be streamed at a first bitrate. At 406, the service provider network 102 may store the second file in a second storage tier, the second file configured to be streamed at a second bitrate that is greater than the first bitrate.

At 408, the service provider network 102 may receive a request to stream the video content item to a user device. At 410, the service provider network 102 may stream the first data representing the video content item from the first storage tier to the user device at the first bitrate. At 412, the service provider network 102 may move the second file to the first storage tier. At 414, the service provider network 102 may stream the second data from the first storage tier to the user device at the second bitrate.

Figure 5:
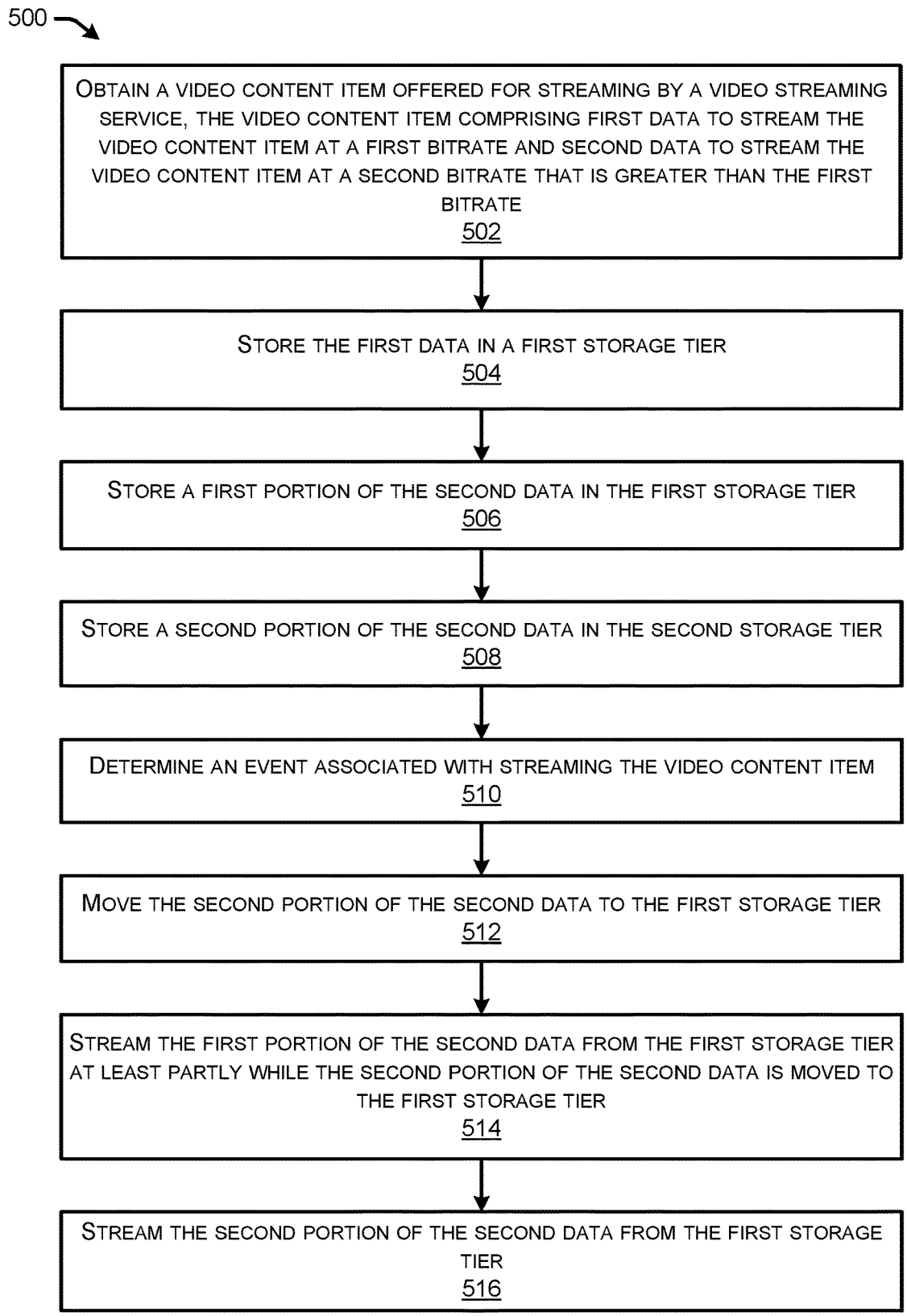
FIG. 5 illustrates a flow diagram of an example method for storing files representing a video content item in a tiered storage environment, and streaming the video content item to a user device after detecting an event associating with streaming the video content item.

FIG. 5 illustrates a flow diagram of an example method 500 for storing files representing a video content item in a tiered storage environment, and streaming the video content item to a user device after detecting an event associating with streaming the video content item.

At 502, the service provider network 102 may obtain a video content item offered for streaming by a video streaming service, the video content item comprising first data to stream the video content item at a first bitrate and second data to stream the video content item at a second bitrate that is greater than the first bitrate.

At 504, the service provider network 102 may store the first data in a first storage tier. At 506, the service provider network 102 may store a first portion of the second data in the first storage tier.

At 508, the service provider network 102 may store a second portion of the second data in the second storage tier. At 510, the service provider network 102 may determine an event associated with streaming the video content item. The event may comprise various actions, such as a request from a user device 110 to stream, an administrator of the video streaming service 104 and/or service provider network 102 requesting that the video content item be streamed, a machine-learning algorithm indicating that the video content item 114 is going to become popular soon, and/or other events. For instance, the video content item 114 may be popular soon based on social media platforms indicating the popularity increasing, or that the item 114 is trending.

At 512, the service provider network 102 may move the second portion of the second data to the first storage tier. At 514, the service provider network 102 may stream the first portion of the second data from the first storage tier at least partly while the second portion of the second data is moved to the first storage tier. At 516, the service provider network 102 may stream the second portion of the second data from the first storage tier.

Figure 6:
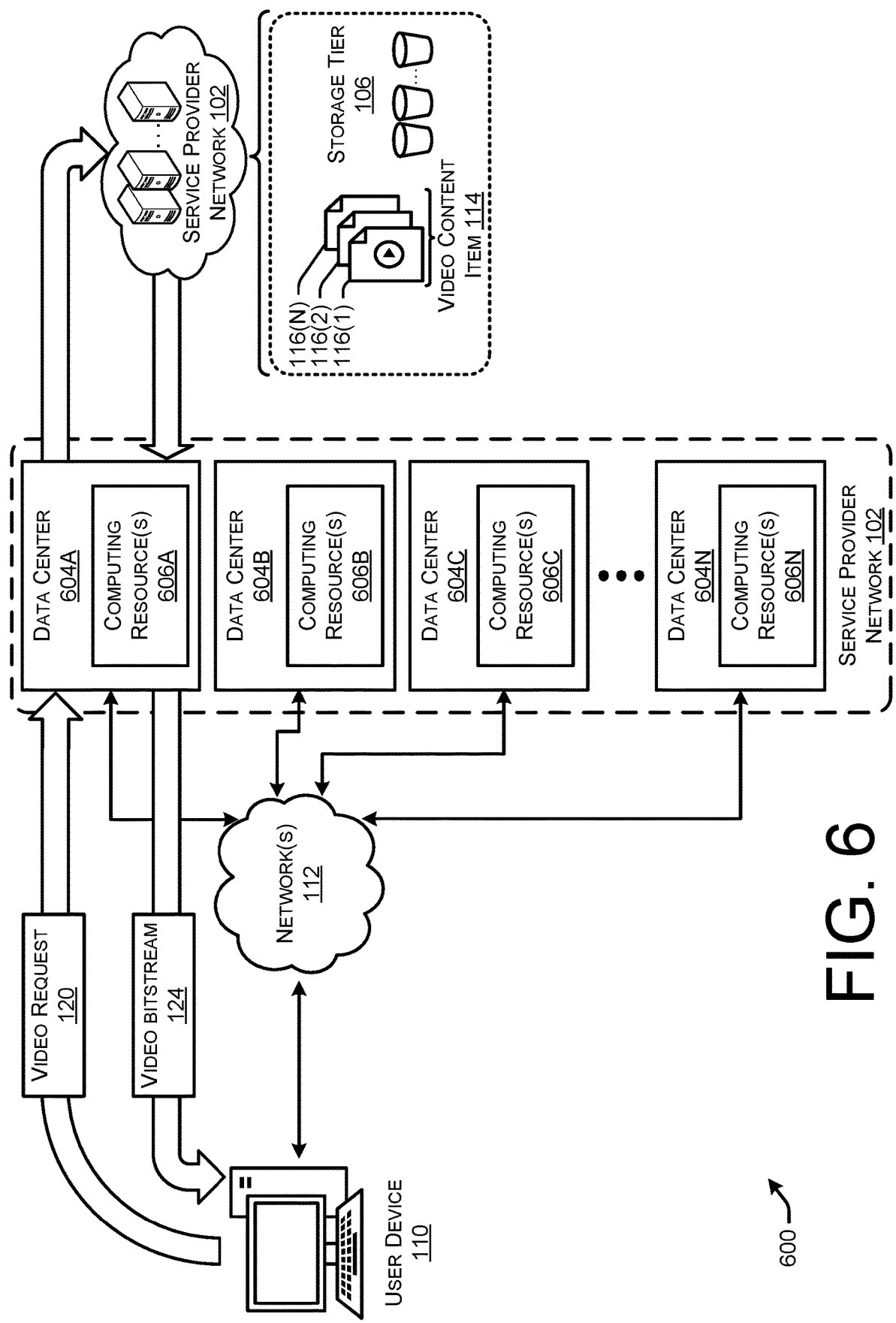
FIG. 6 illustrates a system and network diagram that shows an illustrative operating environment that includes a service provider network that can be configured to implement aspects of the functionality described herein.

FIG. 6 is a system and network diagram that shows an illustrative operating environment 600 that includes a service-provider network 102 (that may be part of or associated with a cloud-based service network/platform) that can be configured to implement aspects of the functionality described herein.

The service-provider network 102 can provide computing resources 606, like VM instances and storage, on a permanent or an as-needed basis. Among other types of functionality, the computing resources 606 provided by the service-provider network 102 may be utilized to implement the various services described above. The computing resources provided by the service-provider network 102 can include various types of computing resources, such as data processing resources like VM instances, data storage resources, networking resources, data communication resources, application-container/hosting services, network services, and the like.

Each type of computing resource provided by the service-provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service-provider network 102 can also be configured to provide other types of computing resources not mentioned specifically herein.

The computing resources 606 provided by the service-provider network 102 may be enabled in one embodiment by one or more data centers 604A-604N (which might be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 can also be located in geographically disparate locations. One illustrative embodiment for a data center 604 that can be utilized to implement the technologies disclosed herein will be described below with regard to FIG. 7.

The data centers 604 may be configured in different arrangements depending on the service-provider network 102. For example, one or more data centers 604 may be included in or otherwise make-up an availability zone. Further, one or more availability zones may make-up or be included in a region. Thus, the service-provider network 102 may comprise one or more availability zones, one or more regions, and so forth. The regions may be based on geographic areas, such as being located within a predetermined geographic perimeter.

The users and/or admins of the service-provider network 102 may access the computing resources 606 provided by the data centers 604 of the service-provider network 102 over any wired and/or wireless network(s) 112 (utilizing a user device 110 and/or another accessing-user device), which can be a wide area communication network ("WAN"), such as the Internet, an intranet or an Internet service provider ("ISP") network or a combination of such networks. For example, and without limitation, a device operated by aa user of the service-provider network 102 may be utilized to access the service-provider network 102 by way of the network(s) 112. It should be appreciated that a local-area network ("LAN"), the Internet, or any other networking topology known in the art that connects the data centers 604 to remote clients and other users can be utilized. It should also be appreciated that combinations of such networks can also be utilized.

As illustrated in FIG. 6, the service-provider network 102 may be configured to support some or all of the components of the service-provider network 102. For example, the computing resources 606 in one or all of the data centers 604 may store and provide the video content items 114 described herein. For instance, the data centers 604 may be edge locations that are geographically disparate to reduce latency to users 110 located at different geographic locations. In some examples, the storage tiers 106 may be located across one or more data centers 604.

In various examples, the data centers 604 may each be respective "edge locations" in the service provider network 102 to serve the video content items 114 with lower latency at different geographic areas. The edge locations, or data centers 604, may deliver content to users 108 with lower latency and serve as edge caches for the video content items 114. In some examples, the storage tiers 106 may be an origin service with selectable options. For instance, if the files 116 are transitioned into a hot storage tier 106(1) of the origin service, the video content item 114 may be pushed to an edge location by an origin push. In some instances, an edge location 604A may receive the video request 120, and request that the origin service provide the video content item 114 for streaming in the video bitstream 124 to the user device 110. In some examples, the storage tiers 106 may be implemented in the respective data centers 604, or edge locations, as illustrated in FIG. 7.

Figure 7:
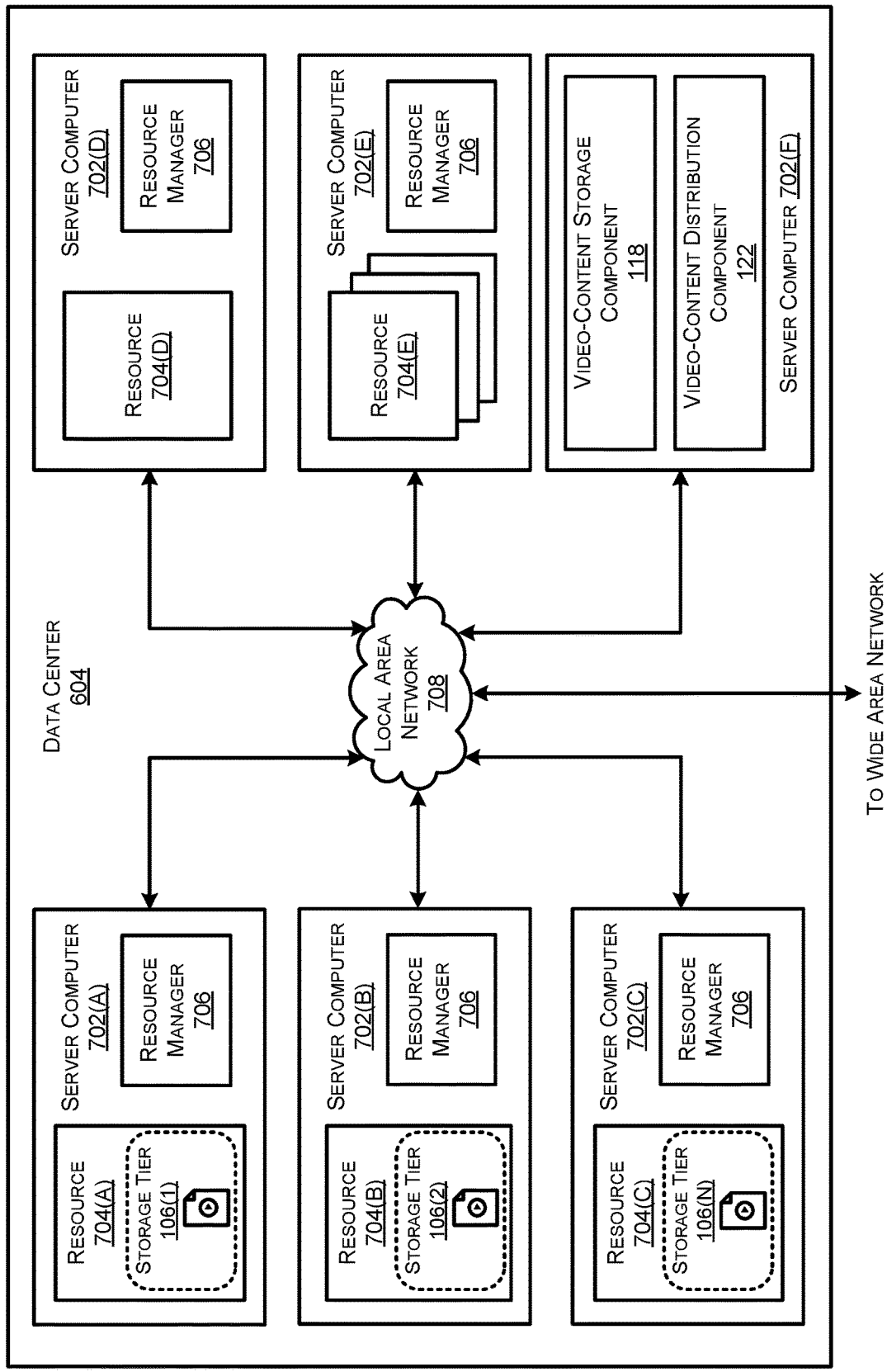
FIG. 7 illustrates a computing system diagram illustrating a configuration for a data center that can be utilized to implement aspects of the technologies disclosed herein.

FIG. 7 is a computing system diagram illustrating a configuration for a data center 604 that can be utilized to implement aspects of the technologies disclosed herein. The example data center 604 shown in FIG. 7 includes several server computers 702A-702F (which might be referred to herein singularly as "a server computer 702" or in the plural as "the server computers 702") for providing computing resources 704A-704E. In some examples, the resources 704 and/or server computers 702 may include, or correspond to, the computing resources 606 described herein.

The server computers 702 can be standard tower, rack-mount, or blade server computers configured appropriately for providing the computing resources described herein (illustrated in FIG. 7 as the computing resources 704A-704E). As mentioned above, the computing resources provided by the service-provider network 102 can be data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 604 can also be configured to provide network services and other types of services.

In the example data center 604 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 604A-604N, between each of the server computers 702A-1002F in each data center 604, and, potentially, between computing resources in each of the server computers 702. It should be appreciated that the configuration of the data center 604 described with reference to FIG. 7 is merely illustrative and that other implementations can be utilized.

As illustrated in FIG. 7, the storage tiers 106 may be individually assigned to different resources 704 in the server computers 702. For instance, the resources 704(A), 704(B), and 704(C) may each comprise a different type of hardware storage, and/or be configured for storing video content items 114 for different latencies and/or access rates. For instance, the resources 704(C) may be nearline storage that is in a spun down/low power state such that, when a retrieval operation is initiated to obtain files 116 from resource 704(C), the plates may need to be spun up to retrieve the files 116. The files 116 may then be transitioned, such as over the LAN 708, to the hot storage tier 106(1) in the server computer 702(A).

Figure 8:
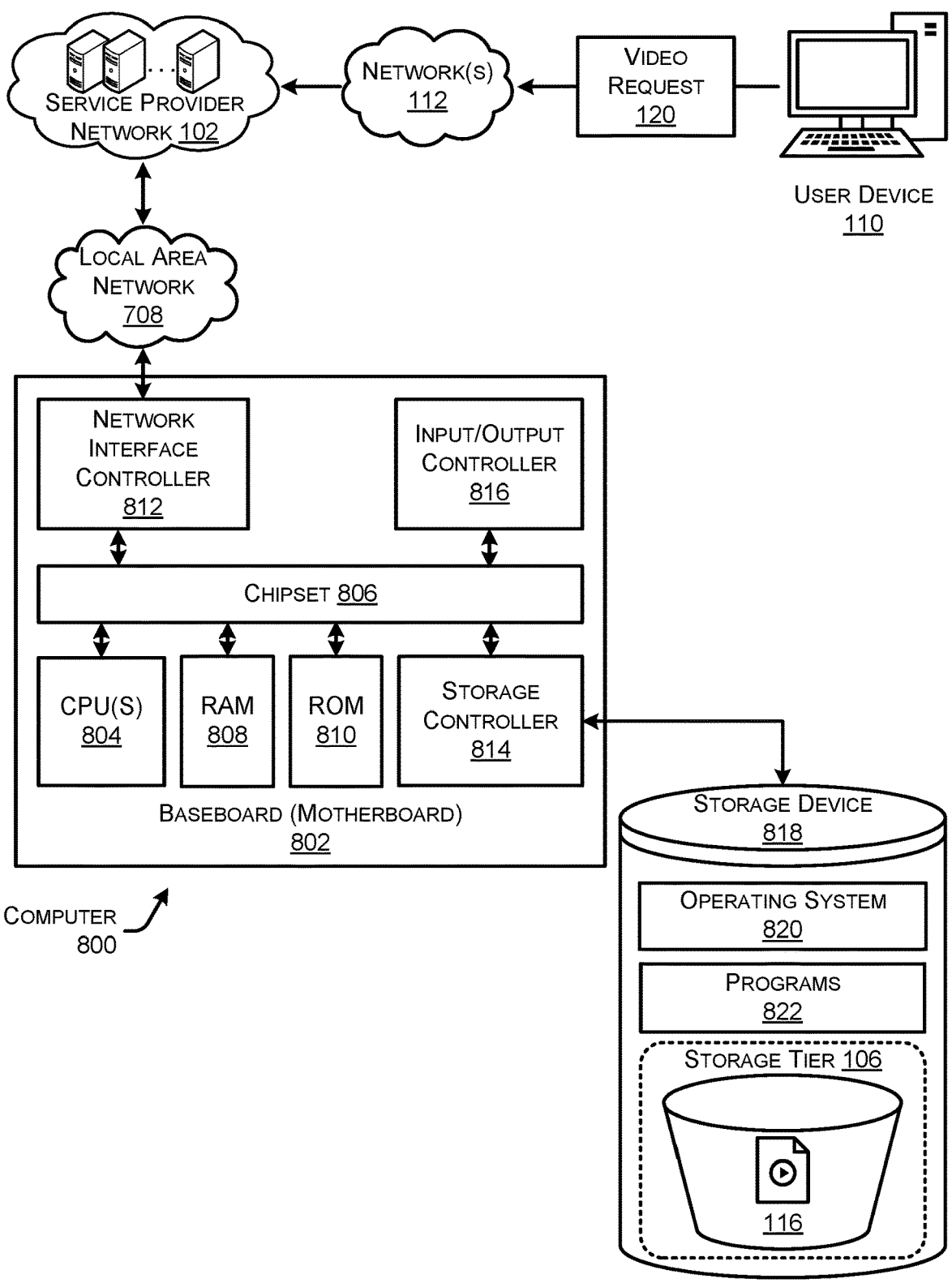
FIG. 8 is a computer architecture diagram showing an illustrative computer hardware architecture for implementing a computing device that can be utilized to implement aspects of the various technologies presented herein.

FIG. 8 shows an example computer architecture for a computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory ("ROM") 810 or non-volatile RAM ("NVRAM") for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as the network 1008. The chipset 806 can include functionality for providing network connectivity through a NIC 812, such as a gigabit Ethernet adapter. The NIC 812 is capable of connecting the computer 800 to other computing devices over the network 1008 (or 84). It should be appreciated that multiple NICs 812 can be present in the computer 800, connecting the computer to other types of networks and remote computer systems.

The computer 800 can be connected to a mass storage device 818 that provides non-volatile storage for the computer. The mass storage device 818 can store an operating system 820, programs 822, and data, which have been described in greater detail herein. The mass storage device 818 can be connected to the computer 800 through a storage controller 814 connected to the chipset 806. The mass storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 800 can store data on the mass storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 818 is characterized as primary or secondary storage, and the like.

For example, the computer 800 can store information to the mass storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the mass storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the service provider network 102, and or any components included therein, may be supported by one or more devices similar to computer 800. Stated otherwise, some or all of the operations performed by the service-provider network 102, and or any components included therein, may be performed by one or more computer devices 800 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 818 can store other system or application programs and data utilized by the computer 800.

In one embodiment, the mass storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As shown in FIG. 8, the storage device 818 may comprise a particular type of hardware storage that is configured to provide storage for one of the storage tiers 106, and store the files 116. In this way, the computer 800 may receive video requests 120, and provide streaming of the files 116 for the video content items 114.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed by the one or more processors, cause the one or more processors to:
receive a video content item offered for streaming by a video streaming service, the video content item including:
a first file comprising first data of a first size, the first data representing the video content item and configured to be streamed at a first bitrate;
a second file comprising second data of a second size, the second file representing the video content item and configured to be streamed at a second bitrate that is greater than the first bitrate, wherein the second size is greater than the first size; and
a third file comprising third data of a third size, the third data representing the video content item and configured to be streamed at a third bitrate that is greater than the second bitrate, wherein the third size is greater than the second size;
store the first file in a first storage tier provided by a cloud-based storage service;
store the second file in a second storage tier provided by the cloud-based storage service, wherein the second storage tier stores files that are accessed less frequently than files stored in the first storage tier;
store the third file in a third storage tier provided by the cloud-based storage service, based at least in part on a first preference associated with a user associated with a user device associated with the video streaming service;
subsequent to storing the second file in the second storage tier and storing the third file in the third storage tier, determine a period of time since the video content item was last streamed by the user;
based at least in part on the period of time, transition the second file from the second storage tier to the third storage tier, wherein the third storage tier stores files that are accessed less frequently than files stored in the second storage tier;
receive, from the user device, a request to stream the video content item, the user device being a device type associated with the third bitrate at which the third data is streamed; and
responsive to receiving the request to stream the video content item:
stream the first data representing the video content item at the first bitrate to the user device;
transition, to the second storage tier, the third file from the third storage tier; and
transition, to the first storage tier, the third file from the second storage tier, based at least in part on the second storage tier storing files streamed at greater bitrates than files stored in the first storage tier; and
subsequent to transitioning the third file to the first storage tier, transition, at a point in time during streaming of the first data, to stream the third data at the third bitrate associated with the device type, wherein transitioning to stream the third data at the third bitrate is based at least in part on a second preference associated with the user.

2. The system of claim 1, wherein:
the first storage tier is associated with a first latency between receiving requests for video content items stored in the first storage tier and streaming the video content items;
the second storage tier is associated with a second latency between receiving requests for video content items stored in the second storage tier and streaming the video content items; and
the second latency is greater than the first latency.

3. The system of claim 1, wherein the period of time comprises a first period of time, comprising further instructions that, when executed by the one or more processors, cause the one or more processors to:
subsequent to streaming the second data or the third data to the user device, determine that the video content item was streamed by additional user devices more than a threshold number of times; and
based at least in part on the video content item being streamed more than the threshold number of times, refrain from moving the third file from the storage tier for a second period of time.

4. The system of claim 1, comprising further instructions that, when executed by the one or more processors, cause the one or more processors to:
determine a first portion of the first data based at least in part on a retrieval time associated with retrieving files from the third storage tier;
transition a second portion of the first data from the first storage tier to the third storage tier; and responsive to receiving the request to stream the video content item, transition the second portion of the first data to the first storage tier,
wherein streaming the first data at the first bitrate comprises streaming the first portion of the first data to the user device.

5. The system of claim 1, wherein the first preference is used to initially move the third file to the third storage tier that stores files that are accessed less frequently than files stored in any other storage tier among a plurality of storage tiers, the plurality of storage tiers including the first storage tier, the second storage tier, and the third storage tier.

6. The system of claim 1, wherein the second preference is associated with an account for which the user has registered with the video streaming service.

7. The system of claim 1, wherein the second preference is associated with a level of definition for which the user has paid to stream the video content item, the level of definition being determined from among a first level, a second level, and a third level.

8. A computer-implemented method comprising:
obtaining a video content item offered for streaming by a video streaming service, the video content item comprising a first file comprising first data representing the video content item, a second file comprising second data representing the video content item, and a third file comprising third data representing the video content item;
storing the first file in a first storage tier, the first file configured to be streamed at a first bitrate;
storing the second file in a second storage tier, the second file configured to be streamed at a second bitrate that is greater than the first bitrate;
storing the third file in a third storage tier, based at least in part on a first preference associated with a user associated with a user device associated with the video streaming service, the third file configured to be streamed at a third bitrate that is greater than the second bitrate;
determining an event associated with streaming the video content item;
streaming the first data representing the video content item from the first storage tier to the user device at the first bitrate;
receiving a request to stream the video content item at the third bitrate, the user device being a device type associated with the third bitrate at which the third data is streamed;
moving the third file from the third storage tier to the second storage tier, and then from the second storage tier to the first storage tier, to make at least a portion of the third data available for streaming, based at least in part on the third storage tier storing files streamed at greater bitrates than files stored in the second storage tier; and
transitioning, at a point in time during streaming of the first data, to streaming the third data from the first storage tier, based at least in part on the first storage tier storing the third data configured to be streamed to the user device at the third bitrate associated with the device type, and further based at least in part on a second preference associated with the user.

9. The method of claim 8, further comprising:
prior to storing the second file in the second storage tier, storing the second file in the first storage tier;
determining a period of time since the video content item was last streamed by the user; and
storing the second file in the second storage tier based at least in part on the period of time.

10. The method of claim 8, further comprising:
storing, in the first storage tier, a fourth file comprising fourth data representing the video content item, the fourth file configured to be streamed at the second bitrate;
subsequent to storing the fourth file in the second storage tier, determining a period of time since the video content item was last streamed by the user; and
moving the fourth file from the second storage tier to the third storage tier, wherein the third storage tier stores files that are accessed less frequently than files stored in the second storage tier; and
moving the fourth file from the third storage tier to the first storage tier.

11. The method of claim 8, further comprising:
subsequent to streaming the third data to the user device, determine that the video content item was streamed by additional user devices more than a threshold number of times; and
based at least in part on the video content item being streamed more than the threshold number of times, refraining from moving the third file from the first storage tier for a second period of time.

12. The method of claim 8, further comprising:
receiving, from a device associated with the video streaming service, input indicating a preferred bitrate for files stored in the first storage tier, wherein the preferred bitrate corresponds to the first bitrate,
wherein storing the first file in the first storage tier is based at least in part on the preferred bitrate.

13. The method of claim 8, wherein determining the event associated with streaming the video content item comprises receiving a request from the user device to stream the video content item, further comprising:
determining a first portion of the first data based at least in part on a retrieval time associated with retrieving files from the third storage tier;
transitioning a second portion of the first data from the first storage tier to the third storage tier; and
responsive to receiving the request to stream the video content item, transitioning the second portion of the first data to the first storage tier,
wherein streaming the first data at the first bitrate comprises streaming the first portion of the first data to the user device.

14. A system comprising:
one or more processors; and
one or more computer-readable media storing computer-executable instructions that, when executed by the one or more processors, cause the one or more processors to:
obtain a video content item offered for streaming by a video streaming service, the video content item comprising first data to stream the video content item at a first bitrate, second data to stream the video content item at a second bitrate that is greater than the first bitrate, and third data to stream the video content item at a third bitrate that is greater than the second bitrate;
store the first data in a first storage tier;
store the second data in a second storage tier, the second storage tier being configured to store data that is accessed less frequently than data stored in the first storage tier;

store the third data in a third storage tier, based at least in part on a first preference associated with a user associated with a user device associated with the video streaming service, the third storage tier being configured to store data that is accessed less frequently than data stored in the second storage tier;

determine an event associated with streaming the video content item to the user device, the user device being a device type associated with the third bitrate at which the third data is streamed;

based at least in part on determining the event, move the third data to the second storage tier, and then from the second storage tier to the first storage tier, to make at least a portion of the third data available for streaming, further based at least in part on the third storage tier storing files streamed at greater bitrates than files stored in the second storage tier; and transition, at a point in time during streaming of the first data, to stream the third data from the first storage tier at the third bitrate associated with the device type, based at least in part on a second preference associated with the user.

15. The system of claim 14, comprising further instructions that, when executed by the one or more processors, cause the one or more processors to:

prior to streaming the third data from the first storage tier, stream the first data from the first storage tier at the first bitrate to the user device; and subsequent to moving the third data from the third storage tier to the first storage tier, terminate the stream of the first data.

16. The system of claim 14, comprising further instructions that, when executed by the one or more processors, cause the one or more processors to:

prior to storing the second data in the second storage tier, store the second data in the first storage tier;

determine a period of time since the video content item was last streamed by the user; and storing the second data in the second storage tier based at least in part on the period of time.

17. The system of claim 14, comprising further instructions that, when executed by the one or more processors, cause the one or more processors to:

store, in the second storage tier, fourth data to stream the video content item at the second bitrate, subsequent to storing the fourth data in the second storage tier, determine a period of time since the video content item was last streamed by the user;

move the fourth data from the second storage tier to the third storage tier; and move the fourth data from the third storage tier to the first storage tier.

18. The system of claim 14, comprising further instructions that, when executed by the one or more processors, cause the one or more processors to:

store a first portion of the third data in the first storage tier, wherein:

storing the third data in the third storage tier comprises storing a second portion of the third data in the third storage tier;

moving the third data to the first storage tier comprises moving the second portion of the third data to the first storage tier; and streaming the third data from the first storage tier includes streaming the first portion of the third data from the first storage tier at least partly while the second portion of the third data is moved to the first storage tier.

19. The system of claim 14, wherein determining the event comprises at least one of:

determining that the user device streamed another video content item associated with the video content item; or providing a recommendation to the user device to stream the video content item.

20. The system of claim 14, comprising further instructions that, when executed by the one or more processors, cause the one or more processors to:

subsequent to streaming the third data from the first storage tier, determine a period of time since the video content item was last streamed by the user; and move the third data to the third storage tier based at least in part on the period of time.

* * * * *